Figures 1, 2:
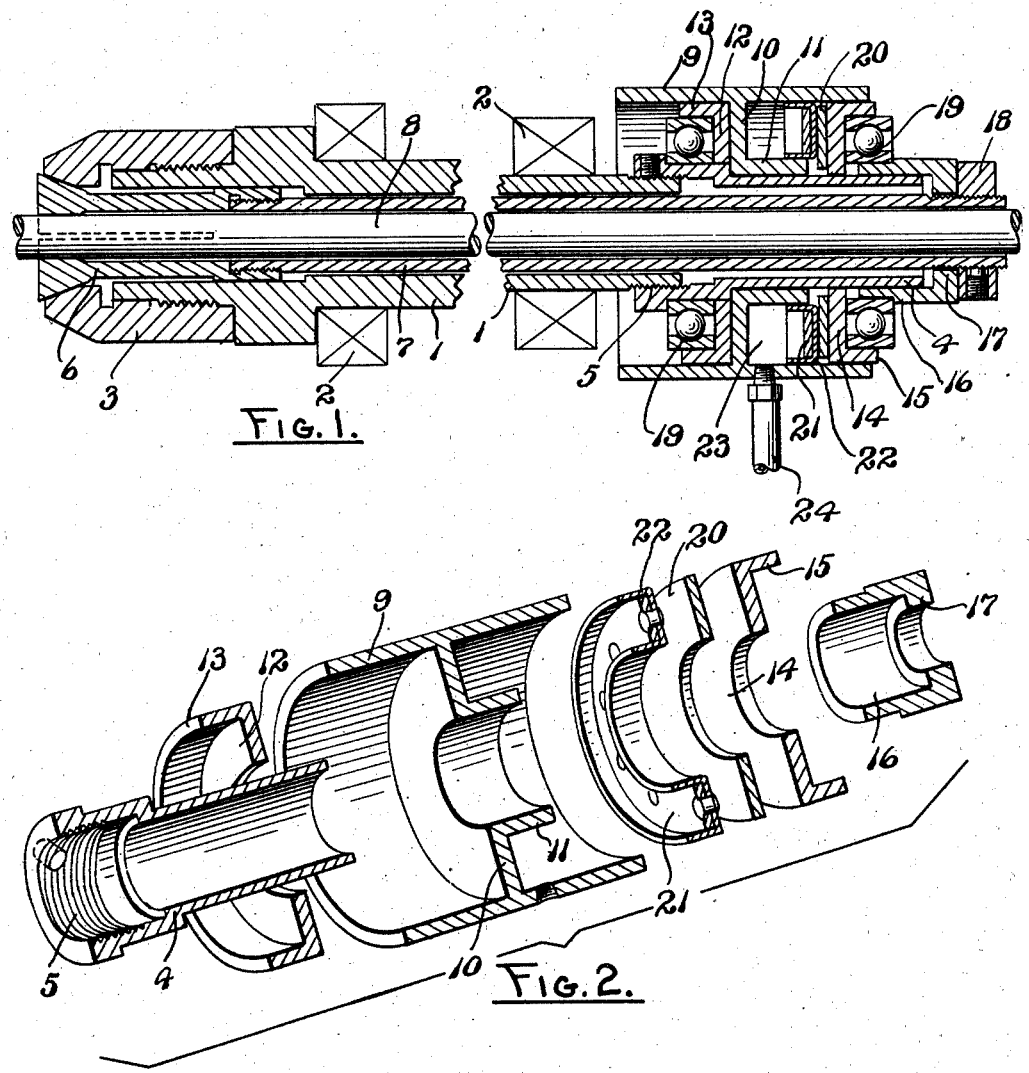

Dec. 7, 1948.  C. KOOIMA  2,455,586

AIR COLLET CLOSER

Filed Sept. 9, 1946

INVENTOR
CHARLES KOOIMA
BY Liverance and
Van Antwerp
ATTORNEYS

Patented Dec. 7, 1948

2,455,586

UNITED STATES PATENT OFFICE 2,455,586

AIR COLLET CLOSER

Charles Kooima, Grand Rapids, Mich.

Application September 9, 1946, Serial No. 695,681

2 Claims. (Cl. 279—4)

1

The present invention relates to a pressure controlled closer for collets, in practice operated by pneumatic or air pressure for the releasable gripping and holding work which is to be processed on a lathe or similar machine. The feeding of work to be processed forwardly at the outer end of a collet to hold the work, the work being gripped and held so that the processing to be done thereon may be accomplished, and after it is done a release for a successive feeding of the work is desirable in connection with machine lathes and other machines which may do analogous work. My invention is directed to a very practical, sturdy and economical structure which may be associated with a lathe spindle and operatively connected therewith, which may be rendered effective to grip the work by turning on the pressure or release it by shutting such pressure off, being done in a very expeditious manner with saving of time and reduction of cost in the processing operations which are performed.

It is a primary object and purpose of the present invention to provide a useful and practical collet closer, readily applied to and installed on a lathe, and one which is sure and certain in its operation.

An understanding of the invention may be had from the following description, taken in connection with the accompanying drawing, in which Fig. 1 is a fragmentary longitudinal vertical section of a driven lathe spindle having my invention applied thereto, and Fig. 2 shows in perspective and longitudinal section the major parts of the collet closure structure of my invention, the roller bearings utilized therewith not being shown.

Like reference characters refer to like parts in the different figures of the drawing.

The lathe spindle 1 is of conventional structure, and has a longitudinal passage therethrough. It is mounted for rotation in suitable bearings, illustrated diagrammatically at 2, which are spaced apart and between which a drive for the spindle may be located for turning it about its longitudinal axis. The front or outer end of the spindle is exteriorly threaded for the detachable connection of the outer member 3 of a collet which is of well known structure, at its outer end having inwardly converging conical sides.

The rear end of the rotating lathe spindle 1 is exteriorly threaded, and the sleeve 4 has an enlarged interiorly threaded end 5 connected therewith. It may be held in fixed relation to the spindle 1 by a set screw as shown. The interior member 6 of the collet has the usual frustoconical head and is longitudinally divided or split at spaced distances around it. It extends into the outer member 3 of the collet and into the hollow spindle 1, having connected thereto, preferably by screw connection, an interior elongated sleeve or tube 7 which extends through the spindle 1 and the sleeve 4 connected therewith, and at its rear end is exteriorly threaded. The rod 8 shown as passing through the sleeve or tube 7 and the interior collet member 6, is the work which is to be processed and may be fed through the collet when not gripped by the interior member 6, but is held by said interior collet member at the times that processing operations are to be formed on it at its forwardly projecting end portion.

With my invention a cylinder 9 is provided which, between its ends, has an integral transverse web 10, with a central opening through it. From the web a sleeve bearing 11 extends rearwardly part of the way to but short of the rear end of the cylinder 9. A metal cup member having a bottom 12 and continuous cylindrical walls 13 has a central opening through which the forward enlarged interiorly threaded portion 5 of the sleeve 4 passes, said bottom 12 being located against the forward side of the web 10.

In the rear open end of the cylinder 9 a similar cup member having a bottom 14 and a continuous annular wall 15 is inserted. It has a central opening for the free passage of the smaller diameter, rear end portion of the sleeve 4. A cap having a cylindrical wall 16 and an outer end 17 is slidably received over said sleeve 4, and the outer end 17 has a central opening for the free passage of the exteriorly threaded end of the tube 7. A nut 18 is adjustably mounted on the rear end of the tube 7 and held in any position to which adjusted by a set screw.

Roller bearings 19 have their outer retaining rings pressed into the cup members described, within the walls 13 and 15, thereof with the inner retaining ring of the forward roller bearing around the head 5 of the sleeve 4, and the inner ring of the rear cup bearing around the inner end portion of the wall 16 of the cap described.

A flat ring 20 is located within the rear end portion of the cylinder 9, sleeve 4 passing therethrough at one side it is adapted to be pressed against the inner side of the bottom 14 of the rear cup member. A piston of annular form, including a metal ring 21 seated within an annular valve 22 of suitable material and firmly secured thereto is located against the inner side of the ring 20. The member 22 of the piston is of channel form in cross section, the ring 21 being permanently connected to its web and the flanges of the valve member 22 are located with the outer flange against the inner side of the cylinder 9, and the inner flange against the sleeve 11. This provides a closed annular chamber 23 for the reception of pressure which is supplied to the chamber through a pipe or conduit 24 connected with the cylinder 9 and leading to the chamber, through which, in practice, compressed air is supplied.

When the chamber at 23 is supplied with air under pressure, the piston is forced to the right (Fig. 1) pressing the ring 20 against the adjacent cup member and transmitting such pressure through the inner ring retainer of the roller bearing 19 to the wall 16 of the cap and therefrom to the nut 18. The piston ring 20, the rear cup member and the rear roller bearing, cap 17 and nut 18 are thereupon moved to the right; and the tube 7 and the inner collet member 6 are moved longitudinally in the same direction. This causes the jaws of the inner collet member 6 to be moved by a wedging action toward each other and against the rod 8, gripping it securely and holding it until the pressure in the chamber 23 is released. Then thus gripped and held, the inner collet member turns with the outer member 3 and with the spindle 1 of the lathe in its rotation. The cylinder 9, the piston structure and the two cup members are stationary, the roller bearings 19 permitting the rotation of the spindle and its connected sleeve and cap relative to the stationary cylinder 9.

On release of the pressure the inner collet member 6 may be released and the rod 8 fed forward a desired amount for the next processing operations. While the machine processing is occurring on the forward end portion of the rod, the pressure within the chamber 23 is maintained, and the gripping and holding of the rod 8 is continuous.

The structure described is readily manufactured and is very easily applied to the spindles of lathes or other similar machines. The structure of the invention is economically manufactured and is certain and effective in its working.

The invention is defined in the appended claims and is to be considered comprehensive of all forms of structure coming within their scope.

I claim:

1. The combination with a rotatably mounted spindle having a chuck at one end and a tube extending through the spindle and projecting from the end opposite the chuck, said tube being connected to said chuck to operate the same by longitudinal movement, of a sleeve connected to the spindle and rotatable therewith, a stationary cylinder having an in-turned flange between its ends surrounding said sleeve, a piston within the cylinder, a cup slidably mounted at the end of the sleeve, means for connecting the cup to said tube, anti-friction bearing means between the cup and the piston, anti-friction bearing means between the sleeve and the cylinder, and means for injecting fluid under pressure between said in-turned flange and said piston.

2. The elements of claim 1 combined with a cylindrical portion formed on said in-turned flange and closely surrounding said sleeve providing an annular space within the cylinder, said piston being annular and located within said annular space, and said fluid injecting means communicating with said annular space.

CHARLES KOOIMA.

REFERENCES CITED

The following references are of record in the file of this patent:

UNITED STATES PATENTS

| Number | Name | Date |
|---|---|---|
| 2,279,730 | Bradley | Apr. 14, 1942 |
| 2,415,181 | Johnson | Feb. 4, 1947 |

FOREIGN PATENTS

| Number | Country | Date |
|---|---|---|
| 221,455 | Great Britain | 1924 |
| 538,509 | Germany | Nov. 14, 1931 |
| 116,895 | Australia | 1943 |